(12) United States Patent
Blades et al.

(10) Patent No.: US 12,358,256 B2
(45) Date of Patent: Jul. 15, 2025

(54) PIPE LINER

(71) Applicant: W.E.Rawson Limited, Wakefield (GB)

(72) Inventors: David Blades, Wakefield (GB); Alexander Johnson, Wakefield (GB)

(73) Assignee: W.E.Rawson Limited, Wakefield (GB)

( * ) Notice: Subject to any disclaimer, the term of this patent is extended or adjusted under 35 U.S.C. 154(b) by 25 days.

(21) Appl. No.: 17/426,686

(22) PCT Filed: Jan. 30, 2020

(86) PCT No.: PCT/GB2020/050228
§ 371 (c)(1),
(2) Date: Jul. 29, 2021

(87) PCT Pub. No.: WO2020/157515
PCT Pub. Date: Aug. 6, 2020

(65) Prior Publication Data
US 2022/0105700 A1    Apr. 7, 2022

(30) Foreign Application Priority Data
Jan. 31, 2019   (GB) .................................... 1901387

(51) Int. Cl.
*B32B 1/08*    (2006.01)
*B29C 53/40*   (2006.01)
(Continued)

(52) U.S. Cl.
CPC ................ *B32B 1/08* (2013.01); *B29C 53/40* (2013.01); *B29C 63/36* (2013.01); *B32B 3/06* (2013.01);
(Continued)

(58) Field of Classification Search
CPC . B32B 1/08; B32B 2262/101; B32B 2597/00; B32B 27/12; B32B 27/304;
(Continued)

(56) References Cited

U.S. PATENT DOCUMENTS 5,698,056 A   12/1997   Kamiyama et al.
5,885,674 A    3/1999   Maemoto et al.
(Continued)

FOREIGN PATENT DOCUMENTS

| FR | 2738773 A1 | 3/1997 |
| GB | 2262322 A | 6/1993 |
| JP | 2012006273 A | 1/2012 |

OTHER PUBLICATIONS

International Search Report and Written Opinion in priority PCT Application No. PCT/GB2020/050228, mailed May 4, 2020 (12 pages).
(Continued)

*Primary Examiner* — Yan Lan
(74) *Attorney, Agent, or Firm* — TROUTMAN PEPPER LOCKE LLP

(57) ABSTRACT

A pipe liner for lining the inside of a pipe, for example a water or sewerage pipe requiring repair. The pipe liner is mainly formed of a fabric sleeve, or a plurality of fabric sleeves, and comprises a ribbon or strip of fibrous material along a longitudinal seam which reinforces the longitudinal seam. The pipe liners may be suitable for use in repairing damaged or degraded pipes and may provide an improvement in the tensile and/or flexural strength of the longitudinal seam compared to a similar pipe liner with a simple butt-stitched longitudinal seam, whilst not suffering from the disadvantages of reinforced welded seam which can be difficult to turn inside out during installation. The present invention also provides a method of manufacturing such a pipe liner, a pipe lining formed from such a pipe liner and a pipe comprising such a pipe lining.

14 Claims, 4 Drawing Sheets

(51) Int. Cl.
  *B29C 63/36* (2006.01)
  *B32B 3/06* (2006.01)
  *B32B 5/02* (2006.01)
  *B32B 27/12* (2006.01)
  *B32B 27/30* (2006.01)
  *B32B 27/32* (2006.01)
  *B32B 27/40* (2006.01)
  *F16L 55/165* (2006.01)

(52) U.S. Cl.
  CPC .............. *B32B 5/022* (2013.01); *B32B 27/12* (2013.01); *B32B 27/304* (2013.01); *B32B 27/32* (2013.01); *B32B 27/40* (2013.01); *F16L 55/1651* (2013.01); *F16L 55/1653* (2013.01); *F16L 55/1654* (2013.01); *F16L 55/1656* (2013.01); *B32B 2262/101* (2013.01); *B32B 2597/00* (2013.01)

(58) Field of Classification Search
  CPC .......... B32B 27/32; B32B 27/40; B32B 3/06; B32B 5/022; B29C 53/40; B29C 63/36; F16L 55/1651; F16L 55/1653; F16L 55/1654; F16L 55/1656
  See application file for complete search history.

(56) References Cited

U.S. PATENT DOCUMENTS

| | | | | |
|---|---|---|---|---|
| 6,042,668 | A * | 3/2000 | Kamiyama | B29C 66/836 156/304.4 |
| 6,136,135 | A | 10/2000 | Kamiyama et al. | |
| 6,254,709 | B1 | 7/2001 | Kamiyama et al. | |
| 6,296,729 | B1 | 10/2001 | Kamiyama et al. | |
| 2014/0373956 | A1* | 12/2014 | Tanner | F16L 55/1651 138/97 |
| 2017/0082220 | A1* | 3/2017 | Free | F16L 55/1651 |

OTHER PUBLICATIONS

UK IPO Search Report in priority GB Application No. GB1901387.9, mailed Jul. 18, 2019 (6 pages).

* cited by examiner

PIPE LINER

FIELD

The present invention relates to a pipe liner for use in repairing pipes such as water or sewage pipes, and to a method of manufacturing such pipe liners. In particular, the present invention relates to glass-reinforced pipe liners comprising longitudinal seams for use with curable polymer compositions.

BACKGROUND

Underground pipes, such as mains water supply pipes and sewers, may degrade over time and/or develop cracks due to changes in temperature (e.g. freezing and thawing of water in or around the pipe) or forces exerted on the pipe by the ground and groundwater surrounding the pipe. Replacing such degraded or cracked pipes can be costly and difficult, particularly when the pipe is buried relatively deeply in the ground or is located underneath a structure. Therefore, such underground pipes are typically repaired in situ by forming a pipe lining—a waterproof continuous tubular structure—within the pipe to be repaired, covering at least the damaged section of pipe. This effectively forms a new pipe within the pipe to be repaired. One way of achieving this is to arrange a flexible sleeve (or pipe liner), such as a felt sleeve, impregnated with a curable resin, in contact with the inside surface of the pipe to be repaired and then allowing the resin to cure to form a self-supporting tubular structure within the pipe.

Such pipe liners are formed from rectangular sheets of flexible material by bringing together opposite side (long) edges of the sheet and stitching or welding these side edges together to form a longitudinal seam. Therefore the short edges of the sheet define the circumference of the pipe liner. The method of joining the side edges of the sheet together may have significant impacts on the properties of the pipe liner and of the pipe lining formed from it.

Before installation, the pipe liner is impregnated with a curable resin. The resin must not be allowed to cure until the pipe liner is in position in the pipe to be repaired. One known method for arranging such a pipe liner impregnated with a curable resin in the pipe to be repaired is to evert the pipe liner into the pipe to be repaired using a pressurised fluid. In such methods, the resin-impregnated pipe liner is secured at one end at an entrance to the pipe to be repaired and then forced along the pipe whilst turning inside out, by the pressurised fluid. Once the pipe liner has been everted into the pipe to be repaired, a pressurised fluid may be used to force the outer surface of the pipe liner into contact with the inner surface of the pipe to be repaired, for example by expanding a rubber bladder arranged within the pipe liner with pressurised air. This ensures that the resin comprised in the pipe liner can conform to the inner surface of the pipe to be repaired after curing to form a structurally sound continuous pipe lining which is arranged in place in the pipe.

Once the pipe liner impregnated with the curable resin is installed in the pipe to be repaired, as described above, curing of the resin may be initiated, propagated or accelerated by heating or irradiation with UV light, depending on the selection of the particular resin. Curing the resin with heat may involve applying hot water to the pipe repair through a suitable conduit. Curing the resin by irradiation with UV light may involve moving one of more UV sources through the pipe to initiate the curing process progressively along the flexible sleeve.

Curing the resin completes the formation of the pipe lining which then provides a continuous waterproof inner surface over the damaged section of pipe. This method can be used to form a pipe lining in a relatively short section of damaged piping or to form a continuous pipe lining throughout the entire length of a pipe, for example a pipe several hundred metres long.

SUMMARY OF THE INVENTION

The inventors have identified several drawbacks with pipe liners formed from sheets of flexible materials. As discussed above, such flexible sheets are commonly joined together by stitching or welding together opposite side edges of the flexible sheets to form a flexible sleeve of pipe liner having a longitudinal seam.

Welding typically involves bringing together the two opposite edges of the flexible sheet which are to form the seam and arranging a strip of polymeric material, suitably a thermoplastic strip, along and bridging the seam. The strip is then heated to partially melt the strip and the underlying fabric which mix together and then re-solidify to form a bond between the two side edges of the flexible sheet, through the strip. However, in glass reinforced felt sheets which are commonly used in such pipe liners for certain applications, welding does not melt the glass fibre reinforcement and therefore the glass fibres in the opposing side edges of the sheet do not weld together, causing a discontinuity in the reinforcement. Therefore the seam formed by this method may not be strong enough to resist the pressures of fitting and may provide a relative weakness in the pipe repair where the glass fibre reinforcement is discontinuous at the seam. Also it is significantly more difficult to turn a pipe liner having a welded seam inside out during installation, particularly when the pipe liner is relatively narrow.

Stitching the two side edges of a glass reinforced felt sheet to provide the seam would also provide a discontinuity in the glass fibre reinforcement of the pipe liner and therefore may also provide a weakness in the pipe liner and the pipe lining formed from it. Furthermore, a pipe liner comprising a simple butt-stitched longitudinal seam would be prone to pulling apart during installation which may thin out the pipe liner and the resin it carries at the seam. This may lead to a thinning and therefore further weakening of the pipe lining formed after curing of the resin. A pipe liner comprising a seam formed by overlapping and stitching through the opposing side edges of the flexible sheet would have an increased thickness in the region of the seam. This may be undesirable in many cases, particularly if the resin is to be cured by irradiation with UV light which can only penetrate a certain thickness of resin impregnated pipe liner.

It is one aim of the present invention, amongst others, to provide a pipe liner that addresses at least one disadvantage of the prior art, whether identified here or elsewhere, or to provide an alternative to existing pipe liners. For instance it may be an aim of the present invention to provide a pipe liner comprising a longitudinal seam which may have improved tensile and/or flexural resistance which does not suffer from the drawbacks of the joining methods discussed above, particularly welding.

According to aspects of the present invention, there is provided a pipe liner, a method of manufacturing a pipe liner and a pipe lining formed from said pipe liner, as set forth in the appended claims. Other features of the invention will be apparent from the dependent claims, and the description which follows.

According to a first aspect of the present invention, there is provided a pipe liner comprising a fabric sleeve and a ribbon of fibrous material, wherein the fabric sleeve comprises a longitudinal seam and the ribbon of fibrous material is joined to the fabric sleeve along and to reinforce the longitudinal seam.

The pipe liners of this first aspect may be suitable for use in repairing damaged or degraded pipes in the way described above. Therefore the pipe liners of this first aspect may have a size and shape chosen to suit a particular pipe to be repaired. The pipe liner comprises a fabric sleeve and may be alternatively or additionally described as a generally elongate fabric structure which defines a conduit open at opposite ends. The fabric sleeve typically has a flattened tubular shape as manufactured (i.e. an elongate pipe with a cross section which is not circular) and is suitably capable of adopting a shape of a pipe to be repaired, for example a tubular shape, when installed (i.e. when the appropriate forces are applied to the fabric sleeve to force it to adopt the shape of a pipe to be repaired, for example a tubular shape). The fabric sleeve suitably has a diameter, thickness and length chosen to suit a particular pipe to be repaired. The fabric sleeve is typically flexible and can therefore adopt different shapes, for example it can be flattened for ease of manufacture and/or transportation. However, the fabric sleeve when expanded from a flattened state can suitably adopt a shape of a pipe to be repaired, for example a tubular shape either before or during installation, and provides a tubular pipe lining when installed. The pipe liner may comprise more than one fabric sleeve, arranged concentrically within each other, i.e. wherein a second fabric sleeve is arranged within the first fabric sleeve. In such embodiments wherein the pipe liner comprises more than one fabric sleeve arranged in this way, the outermost fabric sleeve suitably has a waterproof coating on its outer surface. This waterproof layer would form the inner surface of the pipe lining, which contacts the liquid in the pipe, after eversion and installation of the pipe liner into a pipe to be repaired.

For the avoidance of doubt, throughout this specification the term "pipe liner" is used to refer to an item suitable for use in lining (i.e. repairing) a pipe, such as a water supply pipe or a sewer. In other words in a pre-installation state. The term "pipe lining" is used to refer to a lining installed in a pipe which effectively provides a new pipe within the pipe in which the lining is installed. Also, the pipe liner of this first aspect is suitably in an uncompressed state, i.e. there are no compressive forces acting on the fabric sleeve (except for the weight of the fabric sleeve itself). Furthermore, the pipe liner is suitable for impregnating with a curable resin. However, the pipe liner of this first aspect is suitably not impregnated with a curable resin. Therefore the fabric sleeve may comprise air pockets which can be filled with a curable resin before installation of the pipe liner in a pipe to be repaired.

The fabric sleeve comprises a longitudinal seam and is suitably manufactured by joining opposite side edges of a sheet of fabric to form the longitudinal seam. The longitudinal seam is suitably arranged along the length of the fabric sleeve along opposite side edges of a sheet of fabric used to form the fabric sleeve.

The sheet of fabric used to form the fabric sleeve is suitably rectangular in shape with a pair of opposing long side edges and a pair of opposing short side edges. The fabric sheet suitably has a size selected to suit the particular diameter and length of pipe to be repaired. Typical pipes repaired in this manner have a diameter of from 5 cm to 250 cm. Therefore the pipe liner may have a diameter of from 5 cm to 250 cm and the sheet of fabric used to form the pipe liner may have a length of the short side edges which, when the opposing long side edges of the sheet are brought together, provides the fabric sleeve with an appropriate diameter of from 5 cm to 250 cm. The length of the opposing long side edges of the fabric sheet are suitably selected to provide a desired length of pipe liner, which may be between 50 cm and 10 km.

The fabric which the fabric sleeve (and the fabric sheet from which it is made) is formed from is suitably a fibrous fabric, suitably a non-woven fabric. Suitably the fabric comprises a relatively high proportion of air which is replaced by resin during preparation of the pipe liner for installation in a pipe to be repaired. The fabric therefore mainly functions as a substrate for carrying and introducing resin into a pipe to be repaired in order to form a new pipe within said pipe to be repaired. Suitably the fabric comprises from 80 to 95% air by volume, for example from 88 to 92% air by volume.

The fabric is suitably formed of a non-woven fabric, for example a felt, suitably comprising polymer fibres. The polymer fibres may be selected to be compatible with a curable resin selected for use with the pipe liner. Suitable polymer fibres may be selected from polyester, polypropylene and acrylic fibres. Suitably the fabric sleeve is suitably formed of a polyester felt.

The ribbon of fibrous material is joined to the fabric sleeve along and to reinforce the longitudinal seam. Therefore the ribbon of fibrous material is joined to the fabric sleeve across the longitudinal seam to provide this reinforcement, suitably to improve the tensile strength of the pipe liner, in particular the tensile strength of the longitudinal seam. Suitably the ribbon of fibrous material is joined to both of the opposite side edges of a sheet of fabric which come together at the longitudinal seam to form the fabric sleeve. The longitudinal seam is suitably arranged along the length of the fabric sleeve along opposite side edges of a sheet of fabric used to form the fabric sleeve.

The ribbon of fibrous material may be additionally and/or alternatively defined as a relatively thin (compared to the fabric sleeve) strip of the fibrous material.

The inventors have found that the pipe liner of this first aspect may provide an improvement in the tensile strength of the longitudinal seam compared to a similar pipe liner with a simple butt-stitched longitudinal seam whilst not suffering from the disadvantage of a welded seam which can be difficult to turn inside out during installation, as discussed above.

Furthermore, the pipe liner of this first aspect having the ribbon of fibrous material reinforcing the longitudinal seam may also resist the slight separation of the seam and subsequent thinning of the resin carried by the pipe liner in use which leads to the weakening of the pipe lining described above.

Furthermore, the pipe liner of this first aspect may have the advantage that the longitudinal seam is reinforced without significantly increasing the thickness of the pipe liner at the seam, which would be the case if the seam were formed by overlapping and stitching through the opposing side edges of the flexible sheet. Therefore the pipe liner of this first aspect may be more suitable for use with a resin which is cured by irradiation with UV light which can only penetrate a certain thickness of resin impregnated pipe liner, as discussed above. If a UV curing resin is used with a pipe liner having an overlapped seam, then the maximum thickness of the pipe liner can only be achieved at the seam and the remaining portion of the pipe liner would have a lower than maximum thickness, limiting the useful applications of such a pipe liner.

The fabric sleeve is suitably formed of a reinforced felt. Suitably the fabric sleeve is reinforced with a layer or reinforcing material arranged within the fabric sleeve. Suitably the fabric sleeve is formed of glass-reinforced felt, suitably glass-reinforced polyester felt. Glass-reinforced felt comprises glass fibres within the felt which provide the pipe lining formed from the pipe liner after curing said resin with additional strength, suitably tensile and flexural strength, compared to similar felt comprising no glass fibres. The glass-reinforced felt may comprise at least one layer of glass fibre fabric. The at least one layer of glass fibre fabric may be a woven or non-woven glass fibre fabric, suitably a non-woven glass fibre fabric. The at least one layer of glass fibre fabric is suitably arranged within the felt, suitably through the centre of the felt. The glass-reinforced felt may comprise more than one such layer of glass fibre fabric which may provide additional improvements in tensile strength. The use of glass reinforced felt may be particularly suitable for lining pipes which operate under internal fluid pressure, for example in mains water supply pipes, which are subject to tensile stress from the pressure of the fluid inside the pipe acting outwardly on the walls of the pipe.

Suitably the fabric sleeve has a thickness of from 1 to 10 mm, suitably from 1 to 9 mm, suitably from 2 to 9 mm, suitably from 3 to 9 mm. The fabric sleeve suitably has substantially the same thickness throughout (i.e. around its circumference and along its length), suitably the same thickness throughout. In some embodiments, the pipe liner comprises more than one such fabric sleeve, for example two, three, four, five or more fabric sleeves, in order to provide thicker pipe liners using the same kind of fabric sleeve material.

The ribbon of fibrous material may be formed of a material which enhances the tensile strength of cured resin in a pipe lining formed from the pipe liner of this first aspect. For example, the ribbon of fibrous material may be formed from a reinforcing fibre material, which may be a woven or non-woven reinforcing fibre material, suitably a woven reinforcing fibre material. For example the ribbon of fibrous material may be formed from glass fibre, carbon fibre or boron fibre. Suitably the ribbon of fibrous material is formed of glass fibre, suitably a woven glass fibre fabric. Woven glass fibre fabrics typically have a relatively high resistance to stretching. The ribbon of fibrous material is suitably resistant to stretching so that the longitudinal seam is effectively reinforced against stretching/separating (in a transverse direction relative to the seam) by the ribbon in order to prevent any slight separation of the longitudinal seam. In some embodiments, the ribbon of fibrous material is formed of a non-woven glass fibre fabric.

In some embodiments, the pipe liner comprises a fabric sleeve and a ribbon of fibrous material, wherein the fabric sleeve comprises a longitudinal seam and the ribbon of fibrous material is joined to the fabric sleeve along and to reinforce the longitudinal seam; wherein the fabric sleeve is glass reinforced felt and the ribbon of fibrous material is a glass fibre fabric.

In embodiments of the pipe liner of this first aspect wherein the fabric sleeve is formed of glass-reinforced felt, the ribbon of fibrous material being formed of a strength enhancing material, such as glass fibre, suitably provides a continuity of the glass fibre reinforcement around the circumference of the pipe liner and therefore around the circumference of the pipe lining formed from the pipe liner. This may provide an improved tensile strength of a pipe lining formed from the pipe liner as the cured resin will have a continuous glass fibre reinforcement, compared to pipe liners where the glass fibre reinforcement is interrupted by the longitudinal seam.

Suitably, in the pipe liner of this first aspect, the fabric sleeve is glass reinforced felt and the ribbon of fibrous material is a glass fibre fabric.

In some embodiments, the fabric sleeve is glass reinforced felt and the ribbon of fibrous material is a woven glass fibre fabric.

In some embodiments, the fabric sleeve is glass reinforced felt and the ribbon of fibrous material is a non-woven glass fibre fabric.

In some embodiments, the fabric sleeve is glass reinforced felt comprising a non-woven glass fibre layer and the ribbon of fibrous material is a woven glass fibre fabric.

In some embodiments, the fabric sleeve is glass reinforced felt comprising a woven glass fibre layer and the ribbon of fibrous material is a non-woven glass fibre fabric.

In the pipe liner of this first aspect, the ribbon of fibrous material is suitably thinner than the fabric sleeve, suitably significantly thinner. Suitably the ribbon of fibrous material has up to 50% of the thickness of the fabric sleeve, suitably up to 30%, suitably up to 20%, suitably when compared to the fabric sleeve in an uncompressed state. Suitably the ribbon of fibrous material has a thickness of less than 5 mm, suitably less than 3 mm, suitably less than 2 mm, suitably 1.5 mm or less, for example approximately 1 mm.

The ribbon of fibrous material is suitably relatively narrow compared with the width/diameter of the fabric sleeve. Suitably the ribbon of fibrous material has a width of at least 1 cm, suitably at least 2 cm or at least 3 cm. Suitably the ribbon of fibrous material has a width of up to 10 cm, suitably up to 8 cm, suitably up to 6 cm. Suitably the ribbon of fibrous material has a width of from 1 to 10 cm, suitably from 2 to 8 cm, suitably from 3 to 7 cm.

Suitably the ribbon of fibrous material has a length which is the same as a length of the fabric sleeve, which is typically selected during manufacture and/or prior to fitting according to requirements of the user.

The ribbon of fibrous material is suitably joined to an inside surface of the fabric sleeve, along the longitudinal seam. Pipe liners of the type described herein are typically formed in an inside-out configuration and are everted during installation, as described above. Therefore the inside surface of the pipe liner after manufacture will become the outside surface of said pipe lining after installation. Therefore the ribbon of fibrous material is suitably joined to the fabric sleeve on the inside surface of the fabric sleeve which is to become the outside surface of said pipe lining which contacts and conforms to the shape of an inside surface of the pipe to be repaired. In other words, the ribbon of fibrous material is suitably joined to the fabric sleeve on the pipe contacting surface of the fabric sleeve. Particularly in embodiments wherein the fabric sleeve comprises a waterproof coating, it may be preferred for the ribbon of fibrous material to be joined to the fabric sleeve on the pipe contacting surface of the fabric sleeve. Alternatively, the ribbon of fibrous material may be joined to the fabric sleeve on the outside surface of the fabric sleeve which is to become the inside surface of said pipe lining.

The pipe liner may comprise more than one fabric sleeve arranged concentrically within each other, at least one of which comprises the ribbon of fibrous material joined to the fabric sleeve along and to reinforce its longitudinal seam. In some embodiments, the pipe liner comprises the (first) fabric sleeve comprising the longitudinal seam and the (first) ribbon of fibrous material joining to the (first) fabric sleeve along and to reinforce the longitudinal seam; and at least a second fabric sleeve which may or may not have a second ribbon of fibrous material joining to the second fabric sleeve along and to reinforce a longitudinal seam of the second fabric sleeve.

In some embodiments, the pipe liner comprises:

an outer fabric sleeve of reinforced felt comprising a first longitudinal seam and a first ribbon of fibrous material joined to the outer fabric sleeve along and to reinforce the first longitudinal seam;

an inner fabric sleeve of reinforced felt comprising a second longitudinal seam and a second ribbon of fibrous material joined to the outer fabric sleeve along and to reinforce the second longitudinal seam; and at least one central fabric sleeve arranged concentrically between the outer and inner fabric sleeves, comprising a third longitudinal seam.

The at least one central fabric sleeve may be a non-reinforced felt and may not comprise a ribbon of fibrous material reinforcing the third longitudinal seam. Such a pipe liner may be particularly useful wherein the pipe to be repaired is susceptible to a buckling failure mode (i.e. due to flexion forces). The inventors have found that the inner and outer layers being reinforced by the glass reinforcement in the felt and the ribbons of fibrous material on the longitudinal seams may be significantly more effective in resisting buckling than if only one fabric sleeve was so reinforced and/or if only centre fabric sleeves were so reinforced.

In some embodiments, the pipe liner may comprise a plurality of fabric sleeves, arranged concentrically, comprising longitudinal seams, wherein only a first fabric sleeve of the plurality of fabric sleeves comprises the ribbon of fibrous material joined to the first fabric sleeve along and to reinforce its longitudinal seam, wherein the first fabric sleeve is suitably a glass reinforced felt. The first fabric sleeve may be an inner, outer or centre layer of the pipe liner. Such a pipe liner may be particularly useful wherein the pipe to be repaired is susceptible to a tension failure mode, for example a pipe which operates under internal pressure. The inventors have found that only a single layer of reinforced felt comprising the ribbon of fibrous material may be required to provide an improvement in tension resistance. This avoids the need for further, more costly, reinforced felt fabric sleeves in the pipe liner used for such pipe repairs.

In some embodiments, the pipe liner may comprise a plurality of fabric sleeves, each with a ribbon of fibrous material joining to the fabric sleeve along and to reinforce its longitudinal seam, each fabric sleeve suitably formed of glass reinforced felt. In embodiments wherein the pipe liner comprises more than one fabric sleeve, for example an outer fabric sleeve and an inner fabric sleeve (as manufactured), a first ribbon of fibrous material is suitably joined to an inside surface of the outer fabric sleeve and a second ribbon of fibrous material is suitably joined to an outside surface of the inner fabric sleeve. Therefore the first and second ribbons of fibrous material will be inside the pipe liner, both as manufactured and as installed after eversion, rather than facing outward to the inner surface of the pipe to be repaired or facing inward. This may be advantageous in providing a smoother inner and outer surface of a pipe lining formed from such pipe liners due to the absence of a ribbon of fibrous material on the inner or outer surface of the pipe lining.

In alternative embodiments of the pipe liner comprising a plurality of fabric sleeves, each with a ribbon of fibrous material joining to the fabric sleeve along and to reinforce its longitudinal seam; one of the ribbons of fibrous material may be joined to the inner surface of the innermost pipe liner. This ribbon of fibrous material may therefore be on the outer pipe-contacting surface of the pipe lining after installation and eversion of the pipe liner in a pipe to be repaired.

The benefits of the pipe liner of the present invention discussed herein may be more pronounced in pipe liners comprising more than one fabric sleeve.

Suitably the fabric sleeve comprises a waterproof coating. Suitably the waterproof coating is arranged on an outside surface of the fabric sleeve. As described above, the pipe liner is intended to be everted during installation which means that the outside surface of the fabric sleeve becomes the inside of said pipe lining after installation in a pipe to be repaired. Therefore the waterproof coating is suitably arranged on the non-pipe contacting surface of the fabric sleeve. Suitably the waterproof coating is provided on the opposite side of the fabric sleeve to the ribbon of fibrous material, i.e. the waterproof coating is suitably provided on the non-pipe contacting surface of the pipe liner and the ribbon of fibrous material is suitably joined to the pipe contacting surface of the fabric sleeve.

As described above, known methods for forming pipe liners include overlapping the opposing side edges of the fabric sheet and stitching through both side edges to form a longitudinal seam. In embodiments wherein the fabric sleeve comprises a waterproof coating, forming the fabric sleeve by this overlapping and stitching method creates a barrier to resin penetration in the overlapping region. Therefore a pipe lining formed from such pipe liners will not have a continuous mass of cured resin throughout the thickness of said pipe lining in the overlapping region, as the resin in upper and lower overlapped edges of the fabric sheet are separated by the waterproof coating. This may lead to a weakness in said pipe lining in the overlapping region. Therefore the pipe liner of this first aspect may be particularly advantageous when the fabric sleeve has a waterproof coating, compared to a known pipe liner having a seam formed by overlapping edges of fabric sheet.

Suitably the waterproof coating provides a continuous waterproof barrier to the inside of said pipe lining formed from the pipe liner, after the longitudinal seam has been filled and bridged by cured resin after installation of the pipe liner. The waterproof barrier may provide an additional fluid resistant barrier to said pipe lining formed from the pipe liner and may also be beneficial during installation of the pipe liner as it provides a barrier up to which curable resin can be pumped to fill the pipe liner with said resin.

Suitably the waterproof coating is bonded to the fabric sleeve. Suitably the waterproof coating is provided by a layer of polymeric material bonded to the fabric sleeve. The polymeric material may be selected from a thermoplastic polyolefin (TPO), a thermoplastic polyurethane (TPU) or a polyvinyl chloride (PVC). Suitably specific polymeric materials would be known in the art.

Suitably the waterproof coating has a thickness less than 2 mm, suitably less than 1 mm.

Suitably, in the pipe liner of this first aspect, the fabric sleeve is glass reinforced felt comprising a waterproof coating and the ribbon of fibrous material is a woven glass fibre fabric, wherein the waterproof coating is provided on the opposite side of the fabric sleeve to the ribbon of fibrous material.

Suitably, in the pipe liner of this first aspect, the fabric sleeve is a glass reinforced felt comprising a waterproof coating and the ribbon of fibrous material is a non-woven glass fibre fabric, wherein the waterproof coating is provided on the opposite side of the fabric sleeve to the ribbon of fibrous material.

The waterproof coating may comprise a sealing tape joined to the two opposing side edges of fabric material of the fabric sleeve on the outside surface of the fabric sleeve. The sealing tape suitably seals the longitudinal seam and therefore allows a continuous waterproof coating to be formed around the pipe liner and across the longitudinal seam. The sealing tape may be welded to the outside surface of the fabric sleeve which comprises the waterproof coating.

The pipe liner of this first aspect comprises a longitudinal seam which joins together opposite side edges of a fabric sheet used to form the fabric sleeve. Suitably the longitudinal seam comprises stitching between the two opposing side edges of fabric material of the fabric sleeve. The present invention is particularly advantageous when used with a such a stitched pipe liner, as the ribbon of fibrous material can provide effective reinforcement of a stitched longitudinal seam which would normally suffer the drawbacks of partial separation and thinning of resin during installation therefore leading to a weakness in said pipe lining formed from the pipe liner, as described above. The ribbon of fibrous material may achieve this advantage whilst not suffering from the drawback of a welded seam which can increase the stiffness of the pipe liner and therefore make everting the pipe liner during fitting more difficult, as described above.

Suitably the longitudinal seam does not comprise a weld. In embodiments wherein the fabric sleeve comprises a waterproof coating and a sealing tape welded to the two opposing side edges of fabric material of the fabric sleeve on the outside surface of the fabric sleeve which comprises the waterproof coating, the longitudinal seam suitably does not comprise a weld on the inside surface of the pipe liner. Suitably in such embodiments the weld of the sealing tape is the only weld present. Typically, a welded sealing tape on a waterproof outer coating of a pipe liner would not be provided to join such a fabric sleeve together, it is only present to waterproof the longitudinal seam. Therefore such pipe liners would comprise a sealing tape weld and a longitudinal seam join. Suitably, in the pipe liners of the first aspect, the longitudinal seam join is not a weld.

Suitably there is no overlap of fabric material of the fabric sleeve at the longitudinal seam. Therefore the longitudinal seam is suitably a butt-stitched longitudinal seam.

Suitably the ribbon of fibrous material is stitched to the fabric sleeve on opposing sides of the longitudinal seam. This suitably provides effective reinforcement of the longitudinal seam, both during installation and in said pipe lining formed from the pipe liner.

In such embodiments, the stitching between the two opposing side edges of fabric material of the fabric sleeve which forms the longitudinal seam is suitably also the stitching which joins the ribbon of fibrous material to the fabric sleeve on opposing sides of the longitudinal seam. Therefore the pipe liner of this first aspect suitably comprises a fabric sleeve and a ribbon of fibrous material, wherein the fabric sleeve comprises a stitched longitudinal seam which joins the ribbon of fibrous material to the fabric sleeve along and to reinforce the longitudinal seam.

Therefore the pipe liner of this first aspect suitably comprises a fabric sleeve and a ribbon of fibrous material, wherein the fabric sleeve comprises a longitudinal seam and the ribbon of fibrous material is joined to the fabric sleeve along and to reinforce the longitudinal seam;

wherein the longitudinal seam comprises butt-stitching between the two opposing side edges of fabric material of the fabric sleeve; and wherein the ribbon of fibrous material is stitched to the fabric sleeve on opposing sides of the longitudinal seam by the butt stitching.

In some embodiments, the pipe liner consists essentially of, or consists of, a fabric sleeve and a ribbon of fibrous material, wherein the fabric sleeve comprises a longitudinal seam and the ribbon of fibrous material is joined to the fabric sleeve along and to reinforce the longitudinal seam.

In some embodiments, the pipe liner consists essentially of, or consists of, a fabric sleeve and a ribbon of fibrous material; wherein the fabric sleeve comprises a longitudinal seam and the ribbon of fibrous material is joined to the fabric sleeve along and to reinforce the longitudinal seam; wherein the fabric sleeve comprises a waterproof coating.

According to a second aspect of the present invention, there is provided a method of forming a pipe liner, the method comprising the steps of:

a) providing a sheet of fabric;
b) bringing two opposing side edges of the sheet of fabric together;
c) arranging a ribbon of fibrous material in contact with each of the two opposing side edges of the sheet of fabric;
d) joining together the two opposing side edges of the sheet of fabric to form a sleeve of the fabric comprising a longitudinal seam; and
e) joining the ribbon of fibrous material to each of the two opposing side edges of the sheet of fabric, across the longitudinal seam.

The pipe liner formed in the method may have any of the suitable features and advantages described in relation to the pipe liner of the first aspect. Suitably the pipe liner formed in this method of the second aspect is a pipe liner according to the first aspect. The sheet/sleeve of fabric and the ribbon of fibrous material may have any of the suitable features and advantages described in relation to the first aspect.

Suitably the steps of the method of this second aspect are carried out in the order step a) followed by step b), followed by step c), followed by step d), followed by step e). In some embodiments, steps a), b) and c) may be carried out simultaneously. In some embodiments steps d) and e) may be carried out simultaneously. Suitably steps a), b) and c) are carried out simultaneously followed by steps d) and e) which are carried out simultaneously.

Suitably, the method is carried out using a suitable machine. The machine may therefore be provided with a fabric sheet input station to carry out step a); a fabric sheet guide to carry out step b); a ribbon guide to carry out step c) and a joining station for carrying out steps d) and/or e). Suitably the joining station is a sewing station for joining the two opposing side edges of the sheet of fabric by stitching. Suitable sewing stations and stitching techniques are known in the art.

Step b) suitably involves bringing together the opposing side edges of the sheet of fabric in a face to face manner, wherein the faces contacting each other are provided by the same surface of the fabric sheet. This arrangement is known in the art as the "prayer position".

Step c) suitably involves arranging the ribbon of fibrous material in between the faces of the sheet of fabric which have been brought together in step b). Suitably step c) involves folding the ribbon of fibrous material, for example to form a central fold line running along the length of the ribbon, and placing the fold line between and adjacent to the opposing side edges of the sheet of fabric.

Suitably step d) involves stitching together the two opposing side edges of the sheet of fabric and step e) involves stitching the ribbon of fibrous material to each of the two opposing side edges of the sheet of fabric to provide the pipe liner. Suitably steps d) and e) are carried out at the same time, for example by the same stitching operation using the same sewing station. Therefore the stitching applied in step d) suitably also passes through the ribbon of fibrous material to join the ribbon of fibrous material to each of the two opposing side edges of the sheet of fabric, across the longitudinal seam.

In embodiments wherein the sheet of fabric is stitched in the "prayer position" described above, step e) provides a pipe liner which is folded at the longitudinal seam so that portions of the inside surface of the fabric sleeve contact each other over opposite sides of the longitudinal seam. Therefore, in such embodiments, step e) may be followed by a step f) of unfolding (or flattening) the longitudinal seam to move the two opposing side edges of the sheet of fabric to a "butt-stitched" arrangement wherein the fabric sleeve is approximately flat around the longitudinal seam or wherein the fabric sleeve has adopted an approximately tubular shape.

Therefore the method of forming a pipe liner of this second aspect suitably comprises the steps of:
 a) providing a sheet of fabric;
 b) bringing two opposing side edges of the sheet of fabric together in a face to face manner, wherein the faces contacting each other are provided by the same surface of the fabric sheet;
 c) arranging a ribbon of fibrous material in contact with each of the two opposing side edges of the sheet of fabric and in-between the faces of the sheet of fabric which have been brought together in step b);
 d) stitching together the two opposing side edges of the sheet of fabric to form a sleeve of the fabric comprising a stitched longitudinal seam;
 e) stitching the ribbon of fibrous material to each of the two opposing side edges of the sheet of fabric, across the longitudinal seam; and suitably
 f) unfolding (or flattening) the longitudinal seam to move the two opposing side edges of the sheet of fabric to a butt-stitched arrangement wherein the fabric sleeve is approximately flat around the stitched longitudinal seam or wherein the fabric sleeve has adopted an approximately tubular shape.

Suitably the stitching carried out in step d) provides the longitudinal seam with a stitching which will become a butt-stitched arrangement after unfolding or flattening of the stitched longitudinal seam. This may be referred to as a latent butt-stitched seam.

This method suitably provides a piper liner comprising a longitudinal seam having butt stitching between the two opposing side edges of fabric material of the fabric sleeve; and comprising a ribbon of fibrous material stitched to the fabric sleeve on opposing sides of the longitudinal seam by the butt stitching.

In embodiments wherein the fabric comprises a waterproof coating on one side, step e) may be followed by a step g) of applying a sealing tape to the two opposing side edges of fabric on an outside surface of the fabric comprising the waterproof coating, suitably after a step f) of unfolding (or flattening) the longitudinal seam as described above. The sealing tape suitably seals the longitudinal seam and therefore allows a continuous waterproof coating to be formed around the pipe liner and across the longitudinal seam. The sealing tape may be welded to the outside surface of the fabric sleeve which comprises the waterproof coating.

Suitably the method of this second aspect provides a pipe liner comprising a flexible sleeve having a butt-stitched longitudinal seam with a ribbon of fibrous material reinforcing the longitudinal seam on the inside surface of the pipe liner (i.e. the pipe contacting surface).

The method of this second aspect may efficiently provide a pipe liner comprising a longitudinal seam reinforced with a ribbon of fibrous material, having the advantages described above, without significantly increasing the cost or equipment requirements of manufacture compared to known pipe liners.

According to a third aspect of the present invention, there is provided a resin-loaded pipe liner for installation in a pipe to be repaired, the resin-loaded pipe liner comprising a pipe liner according to the first aspect and a curable resin. Suitable curable resins are known in the art and may be selected according to the particular requirements of the pipe to be repaired. Suitably the curable resin is a liquid and on curing forms a solid polymeric material.

According to a fourth aspect of the present invention, there is provided a pipe lining comprising a tube of polymeric material, wherein a fabric sleeve and a ribbon of fibrous material are arranged within the polymeric material, the ribbon of fibrous material bridging a longitudinal seam in the fabric sleeve.

The fabric sleeve, the ribbon of fibrous material and the longitudinal seam may have any of the suitable features and advantages described above in relation to the first aspect.

The pipe lining of this fourth aspect is suitably formed from a pipe liner according to the first aspect.

In some embodiments, the pipe lining may be a consolidated pipe lining comprising a plurality of layers of pipe lining, formed by installing the plurality of layers of pipe lining sequentially in the pipe to be repaired, each successive pipe lining being installed inside and in contact with the previous pipe lining. In such embodiments, the outermost and innermost pipe linings may comprise at least one layer of glass fibre fabric to reinforce the pipe lining and the pipe linings formed between the outermost and innermost pipe linings may have no such glass fibre fabric reinforcement. This arrangement may provide a consolidated pipe lining which has a good tensile strength due the glass fibre fabric reinforcement in the innermost and outermost pipe linings and good resistance to buckling (due to external pressures acting on the pipe) due to the bulk/thickness of the consolidated pipe lining provided by the pipe lining layers between the innermost and outermost pipe linings.

BRIEF DESCRIPTION OF THE DRAWINGS

For a better understanding of the invention, and to show how example embodiments may be carried into effect, reference will now be made to the accompanying drawings in which.

DETAILED DESCRIPTION OF THE EXAMPLE EMBODIMENTS

Figure 1:
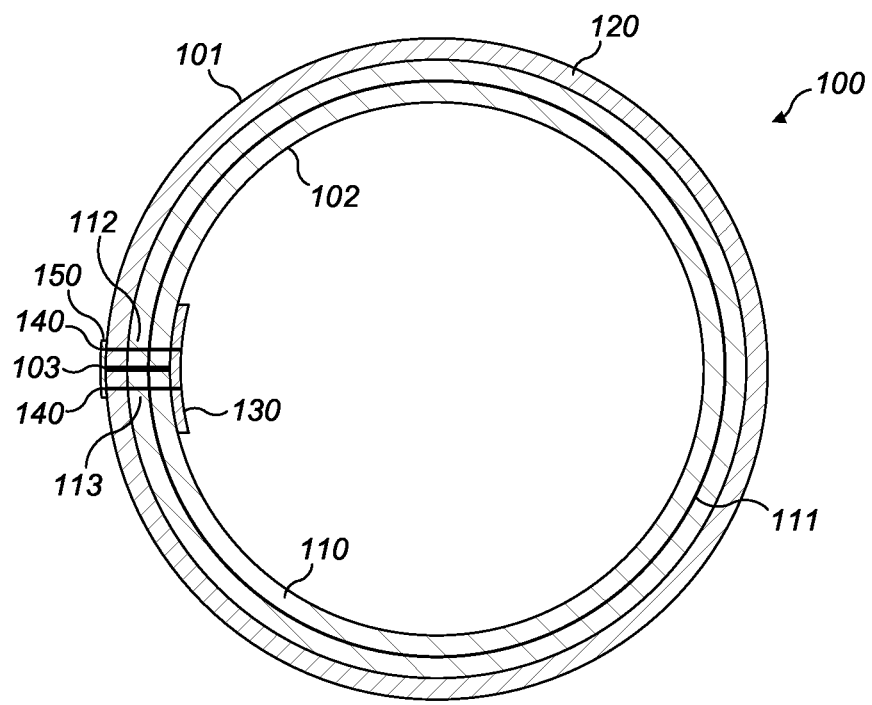
FIG. 1 shows a cross-sectional view of a pipe liner 100 according to the first aspect of the present invention, in the orientation as manufactured.
Figure 2:
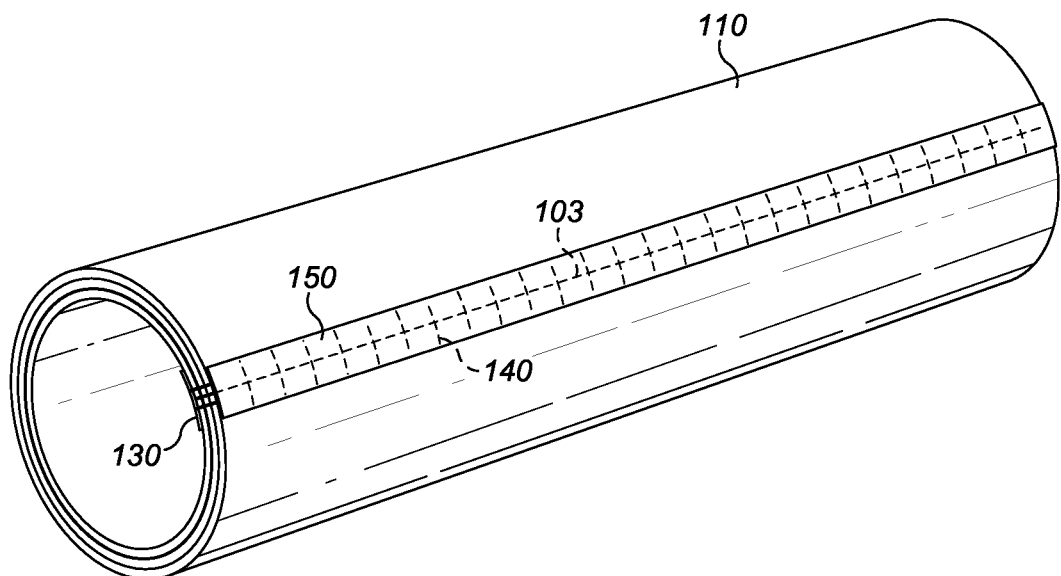
FIG. 2 shows a perspective view of the pipe liner 100 of FIG. 1.

FIG. 1 shows pipe liner 100 comprising a fabric sleeve 110, a waterproof coating 120 and a ribbon of fibrous material 130. The fabric sleeve 110 is a polyester felt having a thickness of 5 mm and comprises a non-woven glass fibre layer 111. Therefore the fabric sleeve 110 is a glass fibre reinforced acrylic felt. The waterproof coating 120 is provided by a thin layer of PVC (a TPO or a TPU may also be used). The ribbon of fibrous material 130 is provided by a woven glass fibre fabric having a thickness of approximately 1.1 mm. The pipe liner 100 has an outer surface 101 and an inner surface 102. The pipe liner is intended for be fitted into a pipe to be repaired by everting the pipe liner during installation. Therefore the inner surface 102 is the outer, pipe contacting surface in use and the outer surface 101 is the inner, non-pipe contacting surface in use. The fabric sleeve 110 comprises a longitudinal seam 103 which passes through the thickness of the fabric sleeve 110 and along its length. The longitudinal seam 103 comprises stitching 140 which passes through the waterproof coating 120, the fabric sleeve 110 (including the non-woven glass fibre layer 111) at opposing ends 112 and 113 and the ribbon of fibrous material 130. The stitching 140 is of a configuration known in the art for stitching pipe liners. The stitching may be provided by a high tenacity thread such as a nylon, polyester or aramid thread. The stitching 140 joins and holds together the opposing ends 112 and 113 of the fabric sleeve 110 and the ribbon of fibrous material 130. FIG. 2 shows the pipe liner 100 in perspective view where the longitudinal seam 103 and stitching 140 is visible along the length of the pipe liner 100. The waterproof coating 120 is made continuous around the outer surface 101 of the pipe liner 100 by the attachment (for example by welding) of a waterproof sealing tape 150 (for example made of a polymeric material) on the waterproof coating, across and covering the longitudinal seam 103.

The pipe liner 100 may have an improved tensile strength compared to a similar pipe liner which does not comprises the ribbon of fibrous material 130, due to the resistance to separation of the longitudinal seam 103 provided by the ribbon 130. Furthermore, the ribbon of fibrous material 130 which is formed by a thin woven glass fibre fabric provides this advantage without affecting the ease of everting and installing the pipe liner, unlike similar pipe liners wherein the longitudinal seam comprises a weld.

Figure 3:
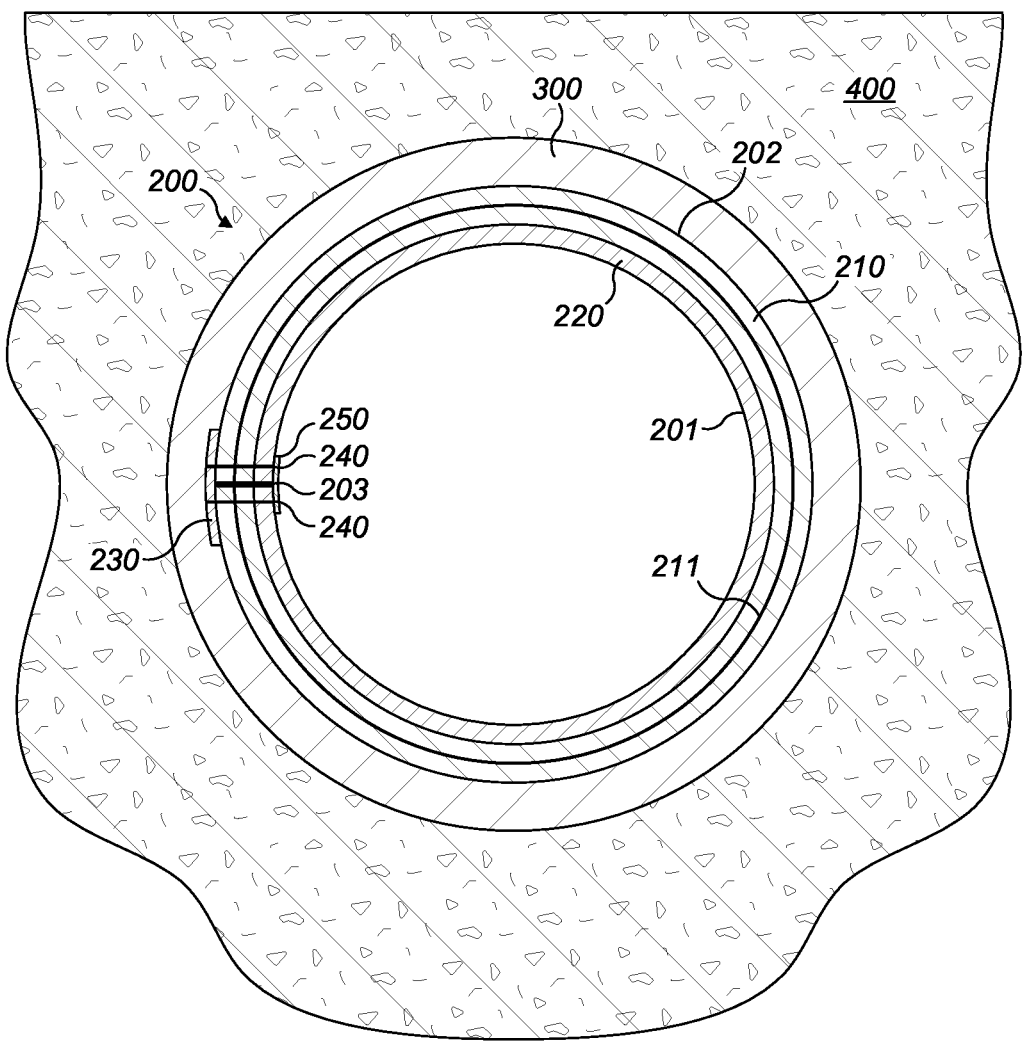
FIG. 3 shows a cross-sectional view of pipe liner 200 according to the first aspect of the present invention which has been everted and installed into a pipe to be repaired.

FIG. 3 shows a pipe lining 200 formed from pipe liner 100 by loading the pipe liner 100 with a curable resin and everting and installing into a pipe to be repaired 300, which is buried in ground 400. Pipes to be repaired which are not buried in the ground are also suitable for repairing with such pipe liners. FIG. 3 shows that inner surface 102 of the pipe liner 100 has become the outer, pipe-contacting surface 202 of the pipe lining 200, and shows that the outer surface 101 of the pipe liner 100 has become the inner non-pipe-contacting surface 201 of the pipe lining 200. The fabric sleeve 110 of pipe liner 100 has been filled with resin (replacing the air previously trapped within the fibres of the fabric sleeve) and cured to provide the felt/resin core 210 of the pipe lining 200. The felt/resin core 210 is reinforced by the non-woven glass fibre layer 211. The pipe lining 200 also comprises the waterproof coating 220 (and sealing tape 250 attached to waterproof coating 220 and covering the longitudinal seam 203) facing into the pipe to be repaired 300. The ribbon of fibrous material 130 (provided by a woven glass fibre fabric) of pipe liner 100 is now on the outer surface 202 of the pipe lining 200 (shown as ribbon of fibrous material 230 bridging longitudinal seam 203) and serves to provide a continuity in the glass fibre reinforcement of the felt/resin core 210 through being joined (by the stitching 240 and being immersed in the cured resin) to the non-woven glass fibre layer 211. This may provide the pipe lining 200 with improved tensile strength compared to similar pipe linings which do not comprise such a ribbon of fibrous material 230. The pipe lining 200 also has an almost uniform thickness throughout its circumference and length due to the almost insignificant thickness of the ribbon of fibrous material 230. This means that the pipe liner 100/pipe lining 200 may be more suitable for resin curing by UV irradiation than similar pipe liners/pipe linings which are overlapped at the longitudinal seam or have a significantly thicker reinforcing strip at the seam.

Figure 4:
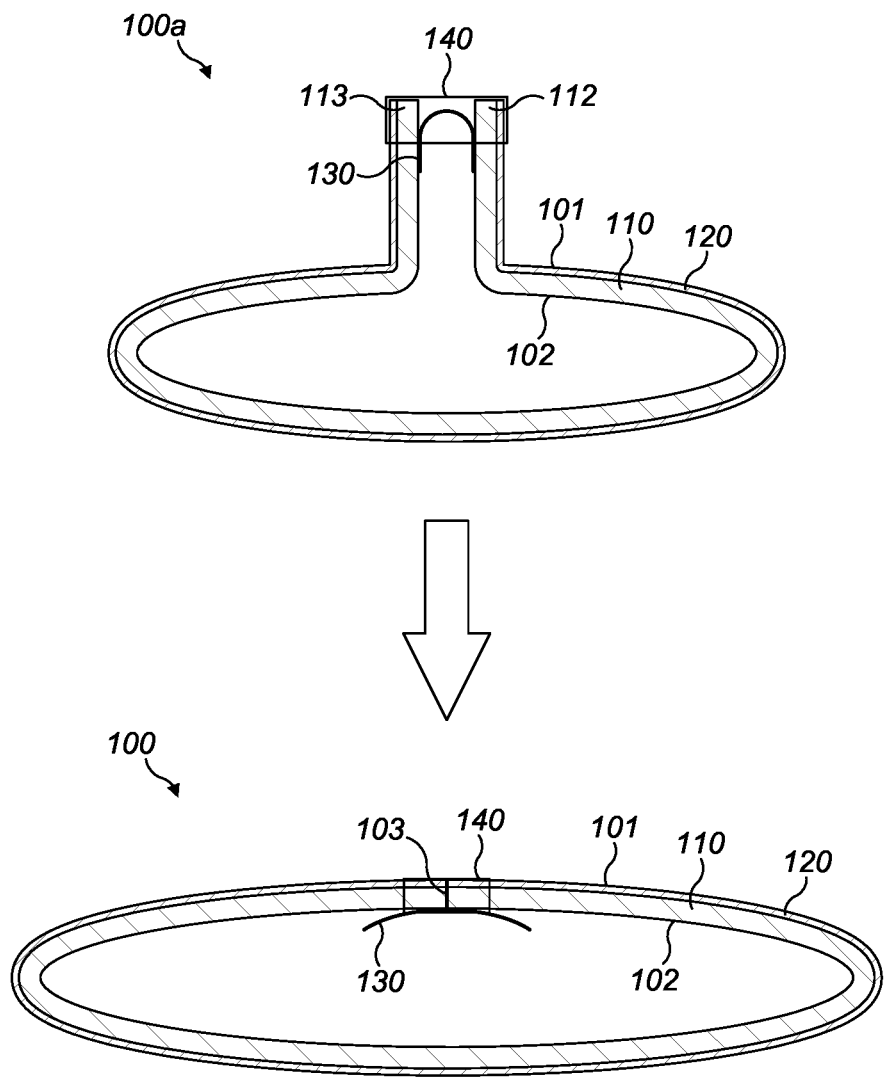
FIG. 4 shows a schematic representation of a pipe liner 100 according to the first aspect of the present invention which has been manufactured in a method according to a second aspect of the present invention.

FIG. 4 shows the arrangement of pipe liner 100 during manufacture according to a method of the second aspect of the present invention. In order to manufacture the pipe liner 100, the fabric sleeve 110 is arranged as shown in 100a wherein opposing edges 112 and 113 are brought together in a face-to-face "prayer" position. The ribbon of fibrous material 130 is folded in half longitudinally and arranged in between opposing edges 112 and 113 of fabric sleeve 110. The fabric sleeve 110 and the ribbon of fibrous material 130 is then stitched through as shown schematically by stitching 140. Once stitched, the "prayer position" of 100a is flattened at the longitudinal seam 103 to provide pipe liner 100, as described above.

Figure 5:
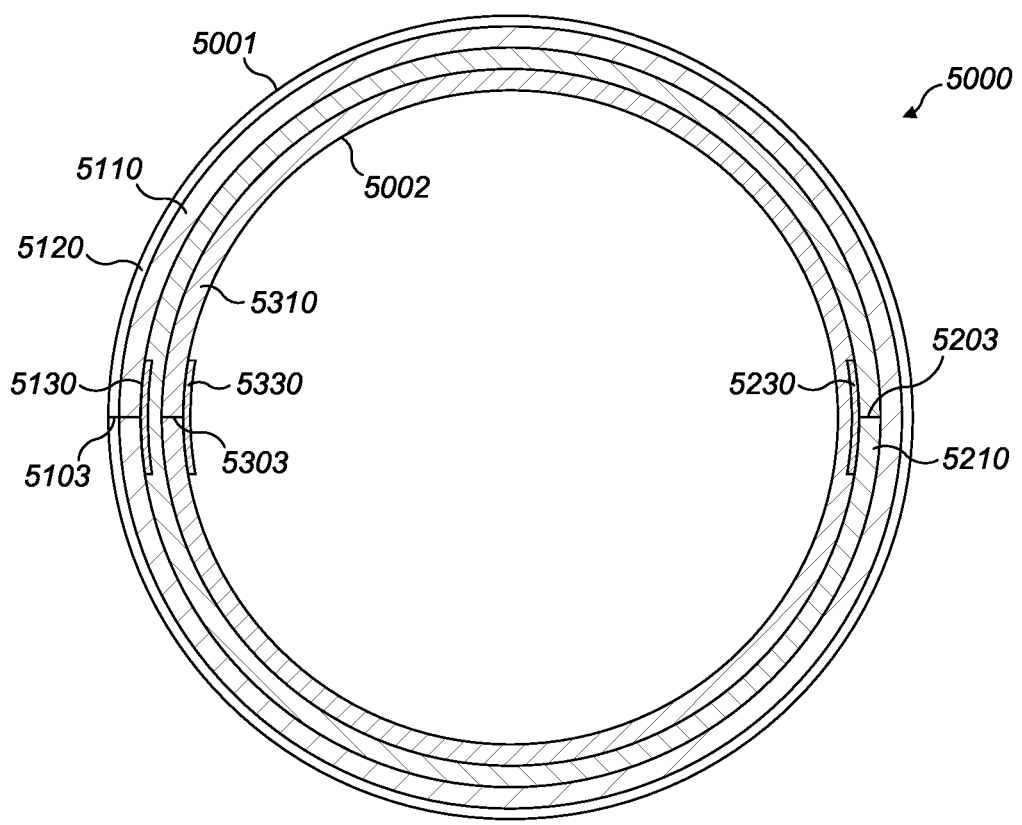
FIG. 5 shows a cross-sectional view of a pipe liner 5000 according to the first aspect of the present invention, in the orientation as manufactured.

FIG. 5 shows a pipe liner comprising three fabric sleeves 5110, 5210 and 5310, which are as described for the fabric sleeve 110 of pipe liner 100 shown in FIG. 1. Fabric sleeve 5110 is an outer fabric sleeve (which becomes the inner facing surface of the pipe lining produced from this pipe liner) formed of glass-reinforced felt and comprises waterproof coating 5120, ribbon of fibrous material 5130, longitudinal seam 5103, stitching (not shown) and sealing tapes (not shown), as described in relation to FIG. 1.

Fabric sleeve 5310 is an inner fabric sleeve (which becomes the outer pipe contacting surface of the pipe lining produced from this pipe liner) formed of glass-reinforced felt and comprises ribbon of fibrous material 5330, longitudinal seam 5303 and stitching (not shown), as described in relation to FIG. 1. Fabric sleeve 5310 does not comprise a waterproof coating or a sealing tape.

Fabric sleeve 5210 is a central fabric sleeve which is arranged in between the outer 5110 and inner 5310 fabric sleeves. Fabric sleeve 5210 comprises ribbon of fibrous material 5230, longitudinal seam 5203 and stitching (not shown), as described in relation to FIG. 1. Ribbon of fibrous material 5230 may be omitted. Fabric sleeve 5210 does not comprise a waterproof coating or a sealing tape. Further central fabric sleeves may be present to provide additional thickness and therefore strength derived from this increased thickness, where necessary.

The pipe liner 5000 is shown as having the longitudinal seams 5103, 5203 and 5303 and ribbons of fibrous material 5130, 5230 and 5330 alternately arranged on the left and right hand sides of the pipe liner. This is to even out any slight thickness increase or strength variation of the pipe liner due to the ribbons of fibrous material.

The pipe liner 5000 may be particularly suitable for repairing a pipe which experiences inward pressure from the ground (and ground water) surrounding the pipe and is therefore likely to fail due to buckling under this pressure. The inner and outer fabric sleeves comprising glass reinforcement and the ribbons of fibrous material reinforcing the longitudinal seams may provide the pipe lining produced from this pipe liner with improved resistance to such buckling.

In alternative embodiments, the pipe liner may not have all three of the ribbons of fibrous material 5130, 5230 and 5330. If not then the pipe liner will at least comprise one ribbon of fibrous material, either 5130, 5230 or 5330. For example, the pipe liner may comprise ribbon 5330 which is on the inner surface 5002 which becomes the outer, pipe contacting surface in use, after eversion and installation into a pipe to be repaired.

Suitably, at least one of the three fabric sleeves 5110, 5210 and 5310 is formed of glass-reinforced felt, preferably each fabric sleeve which is formed of glass-reinforced felt comprises a ribbon of fibrous material 5130, 5230 of 5330 as shown.

The strength of this pipe liner 5000 comprising three fabric sleeves 5110, 5210 and 5310 may be significantly improved relative to a similar known pipe liner comprising three fabric sleeves which does not comprise a ribbon of fibrous material reinforcing the longitudinal seam or seams.

In summary, the present invention provides a pipe liner for lining the inside of a pipe, for example a water or sewerage pipe requiring repair. The pipe liner is mainly formed of a fabric sleeve, or a plurality of fabric sleeves, and comprises a ribbon or strip of fibrous material along a longitudinal seam which reinforces the longitudinal seam. The pipe liners may be suitable for use in repairing damaged or degraded pipes and may provide an improvement in the tensile and/or flexural strength of the longitudinal seam compared to a similar pipe liner with a simple butt-stitched longitudinal seam, whilst not suffering from the disadvantages of reinforced welded seam which can be difficult to turn inside out during installation. The present invention also provides a method of manufacturing such a pipe liner, a pipe lining formed from such a pipe liner and a pipe comprising such a pipe lining.

Although a few preferred embodiments have been shown and described, it will be appreciated by those skilled in the art that various changes and modifications might be made without departing from the scope of the invention, as defined in the appended claims.

Throughout this specification, the term "comprising" or "comprises" means including the component(s) specified but not to the exclusion of the presence of other components. The term "consisting essentially of" or "consists essentially of" means including the components specified but excluding other components except for materials present as impurities, unavoidable materials present as a result of processes used to provide the components, and components added for a purpose other than achieving the technical effect of the invention. Typically, when referring to compositions, a composition consisting essentially of a set of components will comprise less than 5% by weight, typically less than 3% by weight, more typically less than 1% by weight of non-specified components.

The term "consisting of" or "consists of" means including the components specified but excluding addition of other components.

Whenever appropriate, depending upon the context, the use of the term "comprises" or "comprising" may also be taken to encompass or include the meaning "consists essentially of" or "consisting essentially of", and may also be taken to include the meaning "consists of" or "consisting of".

The optional features set out herein may be used either individually or in combination with each other where appropriate and particularly in the combinations as set out in the accompanying claims. The optional features for each aspect or exemplary embodiment of the invention as set out herein are also to be read as applicable to any other aspect or exemplary embodiments of the invention, where appropriate. In other words, the skilled person reading this specification should consider the optional features for each exemplary embodiment of the invention as interchangeable and combinable between different exemplary embodiments.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, and drawings), and/or all of the steps of any method or process so disclosed, may be combined in any combination, except combinations where at least some of such features and/or steps are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, and drawings), or to any novel one, or any novel combination, of the steps of any method or process so disclosed.

The invention claimed is:

1. A pipe liner comprising a fabric sleeve and a ribbon of fibrous material, wherein the fabric sleeve comprises a longitudinal seam and the ribbon of fibrous material is joined to the fabric sleeve along and to reinforce the longitudinal seam;
   wherein the fabric sleeve is formed of glass reinforced felt comprising at least one layer of glass fibre fabric;
   wherein the ribbon of fibrous material consists of a glass fibre fabric;
   wherein the ribbon of fibrous material is stitched to an inside surface of the fabric sleeve, along the longitudinal seam, wherein the stitching passes through the ribbon of fibrous material, the fabric sleeve, and the at least one layer of glass fibre fabric of the fabric sleeve;
   wherein the ribbon of fibrous material is not welded to the fabric sleeve;
   wherein the fabric sleeve further comprises a waterproof coating on an outside surface and a sealing tape, the sealing tape positioned on the outside surface of the fabric sleeve along the longitudinal seam; and
   wherein the sealing tape is welded to the outside surface of the fabric sleeve using a sealing tape weld, and the sealing tape weld is the only weld used in the pipe liner.

2. The pipe liner according to claim 1, wherein the fabric sleeve has a thickness of from 1 to 10 mm.

3. The pipe liner according to claim 1, wherein the fabric sleeve has substantially the same thickness throughout.

4. The pipe liner according to claim 1, wherein the ribbon of fibrous material has a thickness of less than 2 mm.

5. The pipe liner according to claim 1, wherein the longitudinal seam comprises stitching between two opposing side edges of fabric material of the fabric sleeve.

6. The pipe liner according to claim 1, wherein there is no overlap of fabric material of the fabric sleeve at the longitudinal seam.

7. The pipe liner according to claim 1, wherein the longitudinal seam comprises butt stitching between two opposing side edges of fabric material of the fabric sleeve; and
   wherein the ribbon of fibrous material is stitched to the fabric sleeve on opposing sides of the longitudinal seam by the butt stitching.

8. The pipe liner according to claim 1, wherein the fabric sleeve comprises a curable resin.

9. A pipe lining comprising a tube of polymeric material and a pipe liner according to claim 1.

10. The pipe liner according to claim 1, wherein:
    the sealing tape is positioned at an opposite end of the longitudinal seam from the ribbon of fibrous material, and
    the sealing tape waterproofs the longitudinal seam.

11. The pipe liner according to claim 1, wherein:
    the longitudinal seam does not comprise a weld joining two opposing side edges of fabric material of the fabric sleeve.

12. The pipe liner according to claim 1, wherein:
    the ribbon of fibrous material is not welded to either of two opposing side edges of fabric material of the fabric sleeve.

13. A method of forming a pipe liner, the method comprising the steps of:
    a) providing a sheet of fabric formed of glass reinforced felt comprising at least one layer of glass fibre fabric, wherein the sheet of fabric comprises a waterproof coating;
    b) bringing two opposing side edges of the sheet of fabric together in a face to face manner, wherein the faces contacting each other are provided by the same surface of the fabric sheet;
    c) arranging a ribbon of fibrous material which consists of a glass fibre fabric in contact with each of the two opposing side edges of the sheet of fabric and in-between the faces of the sheet of fabric which have been brought together in step b), wherein the ribbon of fibrous material is arranged on the opposite side of the fabric sheet to the waterproof coating;
    d) stitching together the two opposing side edges of the sheet of fabric to form a sleeve of the fabric comprising a stitched longitudinal seam;
    e) joining the ribbon of fibrous material to each of the two opposing side edges of the sheet of fabric without welding, across the longitudinal seam, by stitching the ribbon of fibrous material to an inside surface of the sleeve, along the longitudinal seam, wherein the stitching passes through the ribbon of fibrous material, the sleeve, and the at least one layer of glass fibre fabric;
    f) unfolding the longitudinal seam to move the two opposing side edges of the sheet of fabric to a butt-stitched arrangement wherein the fabric sleeve is approximately flat around the stitched longitudinal seam or wherein the fabric sleeve has adopted an approximately tubular shape; and
    g) applying, by welding, a sealing tape to the two opposing side edges of fabric on an outside surface of the fabric comprising the waterproof coating.

14. The method according to claim 13, wherein step c) involves folding the ribbon of fibrous material to form a fold line running along the length of the ribbon and placing the fold line between and adjacent to the opposing side edges of the sheet of fabric.

\* \* \* \* \*